US009239403B2

(12) United States Patent
Bittar et al.

(10) Patent No.: US 9,239,403 B2
(45) Date of Patent: Jan. 19, 2016

(54) APPARATUS AND METHODS OF CONTROLLING RECORDATION OF RESISTIVITY-RELATED READINGS IN DETERMINING FORMATION RESISTIVITY

(75) Inventors: Michael S. Bittar, Houston, TX (US); Roland Edward Chemali, Humble, TX (US)

(73) Assignee: Hallibburton Energy Services, Inc., Houston, TX (US)

( * ) Notice: Subject to any disclaimer, the term of this patent is extended or adjusted under 35 U.S.C. 154(b) by 1092 days.

(21) Appl. No.: 13/220,112

(22) Filed: Aug. 29, 2011

(65) Prior Publication Data

US 2013/0054145 A1 Feb. 28, 2013

(51) Int. Cl.

| | |
|---|---|
| ***G01V 3/38*** | (2006.01) |
| ***G01V 3/00*** | (2006.01) |
| ***G01V 3/30*** | (2006.01) |
| ***G01V 11/00*** | (2006.01) |
| *G01V 3/28* | (2006.01) |

(52) U.S. Cl.

CPC ................ *G01V 3/30* (2013.01); *G01V 11/002* (2013.01); *G01V 3/28* (2013.01)

(58) Field of Classification Search

CPC .......... G01V 3/28; G01V 3/30; G01V 11/002
USPC ............................................................. 702/7
See application file for complete search history.

(56) References Cited

U.S. PATENT DOCUMENTS

| | | | | |
|---|---|---|---|---|
| 4,899,112 A | | 2/1990 | Clark et al. | |
| 4,968,940 A | * | 11/1990 | Clark et al. | 324/338 |
| 4,980,643 A | * | 12/1990 | Gianzero et al. | 324/339 |
| 6,476,609 B1 | | 11/2002 | Bittar | |
| 6,594,584 B1 | * | 7/2003 | Omeragic et al. | 702/9 |
| 7,659,722 B2 | | 2/2010 | Bittar | |
| 2003/0085707 A1 | * | 5/2003 | Minerbo et al. | 324/343 |
| 2005/0189946 A1 | | 9/2005 | Moore | |
| 2007/0235225 A1 | * | 10/2007 | Bittar | 175/40 |

(Continued)

FOREIGN PATENT DOCUMENTS

WO WO-2010/021622 A1 2/2010

OTHER PUBLICATIONS

Chemali, R., Bittar, M., Hveding, F., Wu, M., Dautel, M., 2008. "Integrating Images from Multiple Depths of Investigation and Quantitative Signal Inversion in Real Time for Accurate Well Placement." Paper SPE-IPTC-12547. presented at the International Petroleum Technology Conference held in Kuala Lumpur, Malaysia, Dec. 3-5, 2008.*

(Continued)

*Primary Examiner* — Mohamed Charioui
*Assistant Examiner* — John Kuan
(74) *Attorney, Agent, or Firm* — Schwegman Lundberg & Woessner, P.A.; Benjamin Fite

(57) ABSTRACT

In various embodiments, apparatus and methods are provided to determine formation resistivity associated with a well. Measurements taken using sub-arrays of a tool at different distances of investigation can be used to determine formation resistivity, where the sub-arrays are arranged to make azimuthal related measurements. Separations readings related to resistivity can be generated from signals received from different directions and can be analyzed to characterize validity of a measurement reading. Additional apparatus, systems, and methods are disclosed.

32 Claims, 11 Drawing Sheets

(56) References Cited

U.S. PATENT DOCUMENTS

| | | | | |
|---|---|---|---|---|
| 2008/0078580 | A1* | 4/2008 | Bittar | 175/41 |
| 2010/0030477 | A1* | 2/2010 | Yang et al. | 702/9 |

OTHER PUBLICATIONS

Bittar, M., Klein, J., Beste, R., Hu, G., Wu, M., Pitcher, J., Golla, C., Althoff, G., Sitka, M., Minosyam, V., Paulk, M. 2007. A New Azimuthal Deep-Reading Resistivity Tool for Geosteering and Advanced Formation Evaluation. Paper SPE 109971 presented at the SPE Annual Technical Conference and Exhibition, Anaheim, California, Nov. 11-14, 2007.*

Seifert et al., "Deep Electrical Images, Geosignal and Real Time Inversion Help Guide Steering Decisions", Oct. 4-7, 2009, 2009 SPE Annual Technical Conference and Exhibition.*

"Australian Application Serial No. 2012216293, Response filed Sep. 26, 2013 to First Examiner's Report mailed Jan. 30, 2013", 17 pgs.

"Australian Application Serial No. 2012216293, First Examiner Report mailed Jan. 30, 2013", 3 pgs.

Bittar, M., et al., "A New Azimuthal Deep-Reading Resistivity Tool for Geosteering and Advanced Formation Evaluation", *SPE Reservoir Evaluation and Engineering*, vol. 12, No. 1, (Apr. 2009), 270-279.

Anderson, B,, et al., "Response of 2-MHz LWD Resistivity and Wireline Indiuction Tools in Dipping Beds and Laminated Formations", *SPWLA Annual Logging Symposium, Paper A*, (Jun. 24-27, 1990).

Bourg, L., et al., "Resistivity Logging in Horizontal Wells in the Orinoco Heavy Oil Belt: Laterolog or Dielectric Propagation LWD tools?", *SPWLA 48th Annual Logging Symposium*, Jun. 3-6, 2007, 1-16.

"Australian Application Serial No. 2012216293, Subsequent Examiners Report mailed Oct. 30, 2013", 3 pgs.

"Australian Application Serial No. 2012216293, Response filed Feb. 27, 2014 to Examiner's Second Report mailed Oct. 30, 2013", 24 pgs.

* cited by examiner

| GENERATE A PROBE SIGNAL FROM A SUB-ARRAY OF A PLURALITY OF SUB-ARRAYS OF A TOOL AND RECEIVE, IN THE SUB-ARRAY, A SIGNAL FROM A FIRST DIRECTION AND A SIGNAL FROM A SECOND DIRECTION IN RESPONSE TO GENERATING THE PROBE SIGNAL |
|---|

— 210

| COMPARE A FIRST RESISTIVITY-RELATED READING FROM THE SIGNAL FROM THE FIRST DIRECTION TO A SECOND RESISTIVITY-RELATED READING FROM THE SIGNAL FROM THE SECOND DIRECTION TO PROVIDE A SEPARATION READING |
|---|

— 220

| RECORD A RESISTIVITY-RELATED READING FROM THE COMPARISON IF THE SEPARATION READING IS LESS THAN OR EQUAL TO A THRESHOLD LEVEL |
|---|

— 230

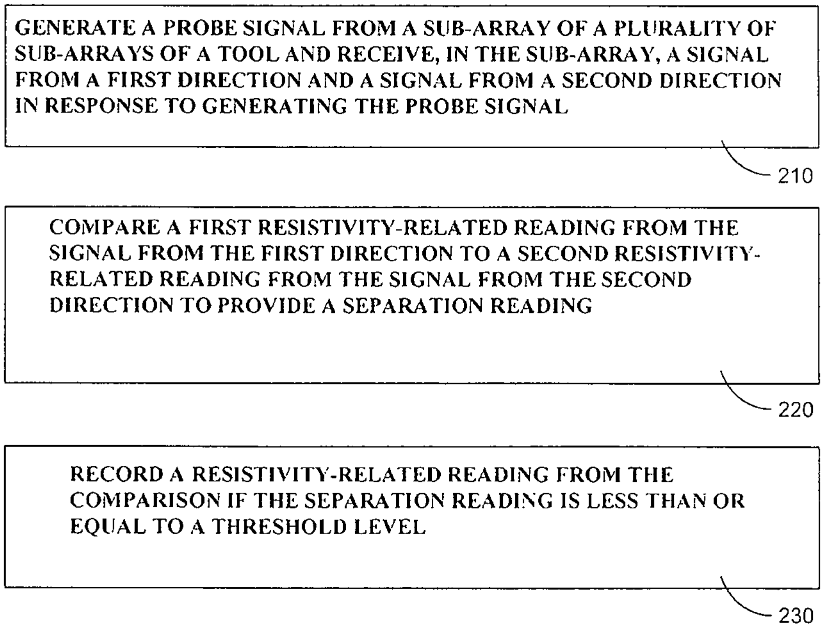

Fig.2

APPARATUS AND METHODS OF CONTROLLING RECORDATION OF RESISTIVITY-RELATED READINGS IN DETERMINING FORMATION RESISTIVITY

TECHNICAL FIELD

The invention relates generally to apparatus for making measurements related to oil and gas exploration.

BACKGROUND

In drilling wells for oil and gas exploration, understanding the structure and properties of the associated geological formation provides information to aid such exploration. Optimal placement of a well in a hydrocarbon-bearing zone (the "payzone") and maintaining the well in the zone usually requires geosteering with deviated or horizontal well trajectories, since most payzones extend in the horizontal plane. Geosteering is an intentional control to adjust drilling direction. Measurements of formation properties can be used to geosteer a well to and maintain the well in the zone.

Various measurement techniques have been developed that can be applied to measurements of formation properties. For example, compensated measurements techniques have been developed for logging devices. In a typical compensated measurement of a logging device, a pair of receivers are located between two transmitters, where the transmitters are alternately energized in opposite directions, and the signals received at the receivers can be processed, such as by averaging, to reduce or eliminate perturbations in reading due to variations in borehole size or tilt of the tool that contains the receivers. See for example U.S. Pat. No. 4,899,112 related to well logging for determining formation resistivity at a shallow and a deep depth. However, boundaries can affect the measurement of the formation properties. Thus, advances in apparatus and methods that address such problems would enhance oil and gas exploration.

BRIEF DESCRIPTION OF THE DRAWINGS

Embodiments of the invention are illustrated by way of example and not limitation in the figures of the accompanying drawings in which:

FIG. 2 illustrates example features of a method to determine formation resistivity, in accordance with various embodiments.

DETAILED DESCRIPTION

Figure 1:
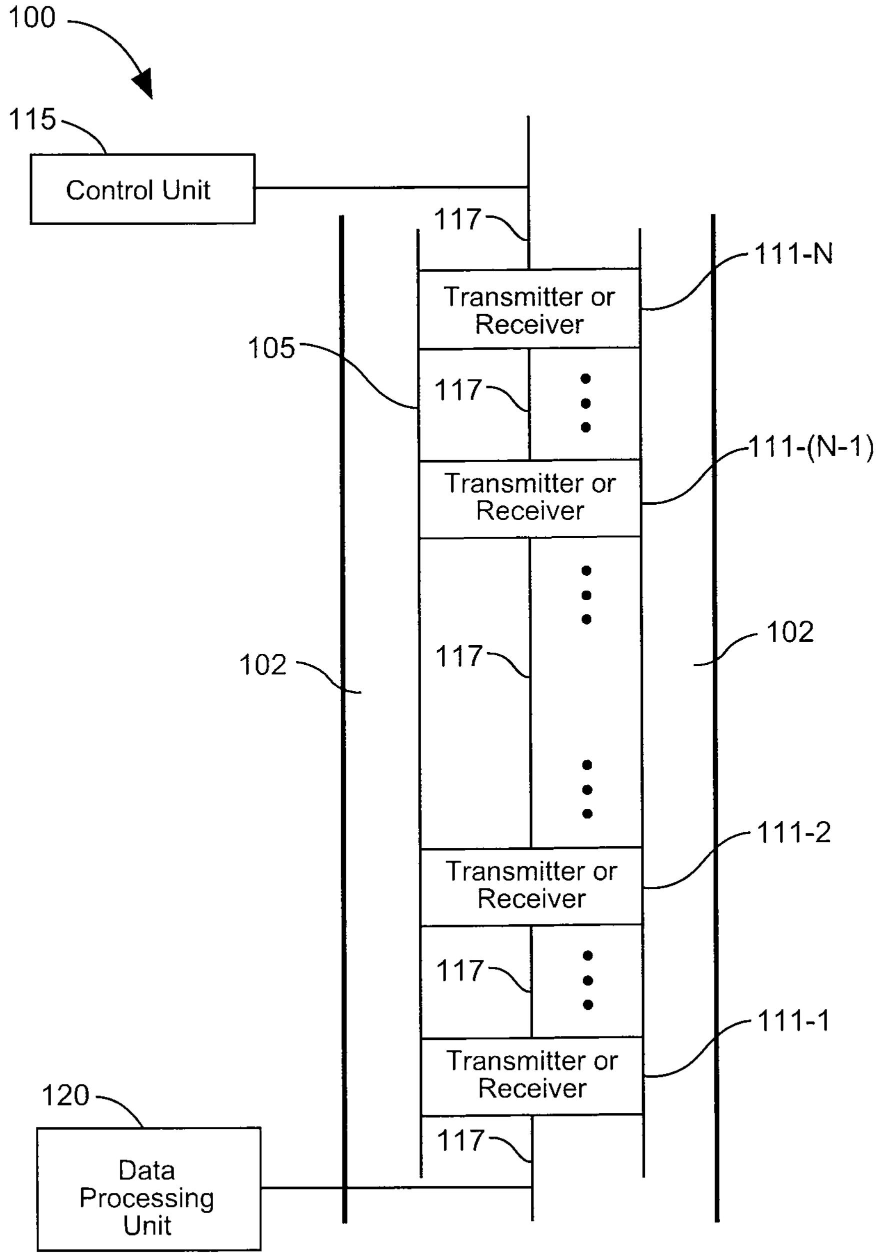
FIG. 1 shows a block diagram of an example system to determine formation resistivity, in accordance with various embodiments.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Logging-while-drilling (LWD) applications in a borehole can be used to determine resistivity of the formation around the borehole, which measurements are corrected for such effects as a borehole effect, invasion, and surrounding bed effects. The borehole effect is related to distortions to a well log due to variations in the borehole. Invasion is related to mud filtrate entering a permeable formation creating an invaded zone typically associated with a diameter of invasion. Traditionally, LWD applications have used non-azimuthal arrays to derive $R_t$, $R_{xo}$, and $d_i$. $R_t$ is the true formation resistivity in the un-invaded zone, that is, the undisturbed formation. $R_{xo}$ is the resistivity of the invaded zone, and $d_i$ is the diameter of the invaded zone. The borehole and the invaded zone (invasion) are assumed cylindrical in typical traditional approach to measurement and analysis. In the traditional approach, an array of transmitters and receivers are used in which non-azimuthal measurements are made. Such an array may be referred to as a non-azimuthal array. The non-azimuthal array can be considered as a set of several sub-arrays. A given sub-array may be considered as characterized by a set of spacings between transmitters and receivers. A given sub-array may be operated at multiple frequencies and interrogated in multiple ways such as attenuation and phase. Measurements from the sub-arrays of the non-azimuthal array are inverted to yield $R_t$, $R_{xo}$, and $d_i$. The inversion may include all the sub-arrays at all the frequencies interrogated in phase and/or attenuation. For the inversion, the information close to the borehole comes from the sub-arrays having shorter spacings, high frequency, and phase interrogation. The information far from the borehole comes from the sub-arrays having the long spacing, attenuation interrogation, and low frequency. The inversion takes into account these measurements weighed by the error model.

In various embodiments, resistivity related measurements can be made using a tool having transmitters and receivers arranged to make azimuthal measurements. When in a thin bed or near a boundary, the traditional non-azimuthal array is affected by the boundary in the form of polarization horns. The assumed cylindrical geometry is no longer valid. $R_t$, $R_{xo}$, and $d_i$ cannot be reliably determined, because the sub-arrays of the non-azimuthal array may be tainted by the approaching boundary and, in the traditional approach, there is no way of determining which sub-array is tainted by the boundary. An approach taken herein uses an observation by the inventors in which it is suspected that the deeper looking sub-arrays are more likely to be tainted than the shallow looking sub-arrays. Instead of using traditional non-azimuthal arrays and sub-arrays, use is made of a tool having an array of transmitters and receivers arranged to make azimuthal measurements, referred to herein as an azimuthal array. For example, an azimuthal deep resistivity (ADR) sensor having tilted antennas in an azimuthal array can be used.

Using the azimuthal array, which sub-arrays are tainted by the boundary and which ones are not can be identified. This identification can be conducted by comparing readings from opposite directions. The directions are partitioned into sections of a rotation called bins. Those sub-arrays where the readings from opposing bins are all similar (i.e. the difference in readings is below a certain threshold) are considered as the good sub-arrays for the measurement. Those sub-arrays that show dissimilarity between any two opposing bins (i.e. the difference in readings is above the threshold) are considered as the bad sub-arrays for the measurement. Measurements only from the good sub-arrays can be kept and used to perform inversion on the measurements. Since, for practice purposes, the good sub-arrays are not under the influence of a boundary and their responses are the same in all azimuth directions, inversion techniques used for the traditional method can be applied. The readings from these good sub-arrays can be operated on using standard inversion techniques similar to or identical to inversion techniques used on data from non-azimuthal sub-arrays.

An azimuthal deep resistivity (ADR) sensor can acquire measurements in a number of discrete directions, called bins or bin directions, allowing for a number of different depths of investigation to determine distance and direction to multiple bed boundaries. For example, an ADR can be arranged with transmitters and receivers to use 32 discrete directions and 14 different depths of investigation. However, ADR arrangements can use more or less than 32 discrete directions and/or more or less than 14 different depths of investigation. An ADR sensor can add a dimension to measurements by using tilted receiver antennas and acquiring data from all possible transmitter-to-receiver spacings a number of times (corresponding to the number of bins) per tool revolution. Tilt of the receivers confers directional sensitivity to the array of ADR sensors. Deeper readings provided by the ADR can improve reaction time, allowing for increased drilling speed. An ADR sensor can provide fully compensated petrophysical-quality resistivity measurements and deep reading geosteering measurements combined in one tool to minimize bottom hole assembly (BHA) length. The azimuthal readings provide for derivation of anisotropy resistivity values, $R_h$ (horizontal) and $R_v$ (vertical), and dip.

In various embodiments, apparatus and methods are provided to determine formation resistivity associated with a well. Measurements taken at different distances from formation boundaries, at different operating frequencies, or at combinations of different distances and frequencies can be used to determine formation resistivity. Sub-arrays having the same spacing can be operated at different frequencies. Two sub-arrays having the same spacing can be operated such that one measures phase and the other measures attenuation. In general, for a given spacing, a sub-array with the lower frequency will tend to investigate deeper from the tool and a sub-array measuring attenuation will investigate deeper than a sub-array measuring phase. Separations in readings associated with resistivity identified in signals received from different directions can be analyzed to characterize validity of a measurement reading for the formation resistivity.

Figure 3:
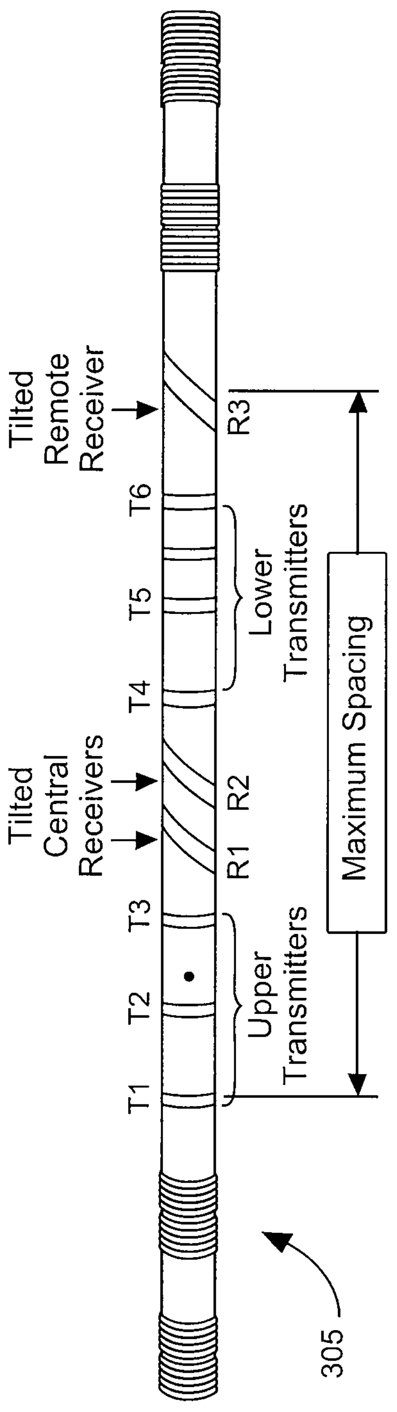
FIG. 3 shows an example tool that can be used in the determination of formation resistivity in FIG. 2, in accordance with various embodiments.

FIG. 1 shows a block diagram of an embodiment of a system 100 to determine formation resistivity. System 100 includes a tool 105 operable in a well. Tool 105 has an arrangement of sensors 111-1, 111-2 . . . 111-(N−1), 111-N along a longitudinal axis 117 of tool 105 structured to make azimuthal related measurements. Each sensor 111-1, 111-2 . . . 111-(N−1), 111-N can be utilized as a transmitting sensor or a receiving sensor under the control of control unit 115. Sensors 111-1, 111-2 . . . 111-(N−1), 111-N can be arranged as a plurality of sub-arrays, where each sub-array includes a transmitter sensor and a receiver sensor spaced apart by a separation distance such that at least two sub-arrays have different separation distances. Sensors disposed in the various sub-arrays can be structured in a number of ways that may depend on the application of tool 105 in a measurement process. Each sub-array can include a tilted coil. Each sub-array can include a number of tilted coils. Each sub-array can include a grouping of two transmitters and two receivers. The two transmitters and the two receivers in a grouping can be arranged with a symmetrical orientation. Tool 105 can be structured as an azimuthal deep resistivity sensor. A non-limiting example of an azimuthal deep resistivity sensor that can be used is shown in FIG. 3. Sensors that are tilted can be arranged with respect to longitudinal axis 117. Sensors 111-1, 111-2 . . . 111-(N−1), 111-N can include a variety of different types of receiving sensors. Sub-arrays having different separation distances between transmitting sensors and receivers can be used to investigate formations over different distances from tool 105. The larger separation distance corresponds to investigating formations over larger distances from the tool.

Control unit 115 is operable to manage generation of a probe signal from the transmitter sensor from each sub-array and collection of received signals in the respective sub-array, where the received signals include a signal relative to a first direction and a signal relative to a second direction with respect to the respective probe signal generated. The first direction and the second direction can be opposite directions from each other relative to a rotation of tool 105 and can correspond to bins associated with tool 105. Control unit 115 is operable to select one or more transmitter sensors from among the sensors in the arrangement of sensors 111-1, 111-2 . . . 111-(N−1), 111-N and to select one or more receiver sensors from among the sensors in the arrangement of sensors 111-1, 111-2 . . . 111-(N−1), 111-N such that the selected receiver sensors are arranged to receive signals from different directions, where for example the different directions are opposite directions. Opposite directions can include from above the tool in a well and from below the tool in the well. Opposite directions can also include from the right side of the tool in a well and from the left side of the tool in the well. System 100 can include a data processing unit 120 to process the received signals to determine the formation resistivity and to characterize the validity of the measured formation resistivity.

Data processing unit 120 can be arranged to analyze the signals from the first direction and the second direction such that a separation reading is provided from a comparison, with respect to the respective probe signal generated, of a first resistivity-related reading from the signal from the first direction to a second resistivity-related reading from the signal from the second direction. The comparison can be a difference between the two signals. Data processing unit 120 controls recording a resistivity-related reading from the comparison if the separation reading is less than or equal to a threshold level. The threshold level can be set to a relatively small value such that the separation reading approaches a zero value. The threshold level can range from zero to a small percentage of a total measured signal or measured resistivity. The separation reading correlated to a threshold value provides a characterization of the validity of the measurement of the formation resistivity. Data processing unit 120 can be arranged to compare a first resistivity based on the signal from the first direction to a second resistivity based on the signal from the second direction. Data processing unit 120 can be arranged to identify a separation in measured resistivity by examining the phase of a geosignal.

Control unit 115 and data processing unit 120 can be arranged to operate the sub-arrays in an iterative process to use a different selected sub-array or the selected sub-array at a different operating frequency in different iterations. The iterative process can be arranged to begin with operation of one of the sub-arrays that has a largest separation distance of the plurality of sub-arrays. Control unit 115 and data processing unit 120 can be arranged to operate the sub-arrays in an iterative process to use a different selected sub-array or the selected sub-array at a different operating frequency in different iterations. The iterative process can be arranged to begin with operation at a frequency that is a lowest frequency among a set of operating frequencies. The lowest frequency corresponds to investigating the formation over the largest distance from tool 105. As the operating frequency is increased, the distance of investigation reduces. Control unit 115 and data processing unit 120 can be arranged to operate all of the sub-arrays to generate probe signals and to receive signals from two opposite directions in response to each respective probe signal generated from each respective sub-array. The resistivity-related readings corresponding to respective separation readings, generated from analysis of the respective received signals from opposite directions, that are less than or equal to a threshold level can be recorded and used in additional procedures to determine formation properties. Control unit 115 and data processing unit 120 can be arranged to operate a selected sub-array of the plurality of sub-arrays to analyze whether the selected sub-array being is influenced by a formation boundary by examination of a phase of a geosignal generated from operation of the selected sub-array.

Data processing 120 can be arranged to invert a set of resistivity-related readings, where the set of resistivity-related readings are acquired from operation of the plurality of sub-arrays. Each one of the set corresponds to its respective separation reading being less than or equal to a threshold level. A formation parameter can be determined from the inversion of the set. The formation parameter can include one or more of a true resistivity, a resistivity of an invaded zone of a borehole, or a diameter of the invaded zone.

In various embodiments, tool 105 can be implemented in measurements-while-drilling (MWD) applications such as a LWD tool. Control unit 115 and data processing unit 120 can be integrated in housings operable in a well along with the plurality of sub-arrays. Tool electronics can be placed inside a collar in a drill string on which the tool is mounted.

FIG. 2 illustrates example features of an embodiment of a method to determine formation resistivity. At 210, a probe signal from a sub-array of a plurality of sub-arrays of a tool is generated. The probe signal can be generated as the tool is rotated. The generation of the probe signal can be correlated to allow collection of signals from all azimuthal directions corresponding to the rotation of the tool. A signal from a first direction and a signal from a second direction are received in the sub-array in response to generating the probe signal. These signals from different directions can be associated with opposite bins of a tool partitioned into bins covering a rotation of the tool. The collection of these signals in opposite bins can be made at different times corresponding to the rotation of the tool. The sub-arrays of the tool can be arranged to make azimuthal related measurements with respect to a borehole. A tool can be operated using the tool structured with each sub-array of the tool having a transmitter and a receiver spaced apart by a separation distance such that at least two sub-arrays of the tool have different separation distances. For a tool having the same separation distances among its sub-arrays, the tool can be operated at different frequencies to investigate a formation over different distances. The tool used in a measurement operation can be structured with the sub-arrays including a tilted coil. The tilted coil, which can provide increased sensitivity, can be arranged on the tool with the tool operated such that the rotation of the tool corresponds to the tilt of the coil being in a bin direction. The tool used in a measurement operation can be structured as an azimuthal deep resistivity sensor.

At 220, a first resistivity-related reading from the signal from the first direction is compared to a second resistivity-related reading from the signal from the second direction to provide a separation reading. The first and second resistivity-related readings can be realized as the signals collected at the receivers in their respective sub-array in the resistivity measurement. The first and second resistivity-related readings can be realized as signals first processed with respect to formation resistivity, which processed signals can be taken as an apparent resistivities for further analysis. Comparing the first resistivity-related reading with the second resistivity-related reading can include comparing a first resistivity based on the signal from the first direction to a second resistivity based on the signal from the second direction. Such comparison can provide the separation reading as an apparent resistivity difference.

At 230, a resistivity-related reading from the comparison is recorded if the separation reading is less than or equal to a threshold level. The threshold level can be set according to the given application or measurement process. If the separation reading is not less than or equal to a threshold level, the resistivity-related readings corresponding to this separation reading can be discarded or ignored. The sub-array corresponding to the discarded or ignored separation readings can be identified as being influenced by environmental conditions such as a boundary and may be marked in an analysis unit or database as not being a good sub-array for the current measurement process.

Recorded resistivity-related readings can be used in an inversion process to determine formation parameters. An inversion process can use a set of recorded resistivity-related readings, where the set of resistivity-related readings are acquired from using the plurality of sub-arrays with each one of the set corresponding to a separation reading satisfying the separation criterion. The set of resistivity-related readings can be inverted and a formation parameter can be determined from inverting the set. Formation parameters determined can include one or more of a true resistivity, a resistivity of invaded zone of a borehole, or a diameter of the invaded zone.

In an embodiment, a procedure to measure formation resistivity can include using all of the sub-arrays to generate probe signals and to receive signals from two opposite directions in response to each respective probe signal generated from each respective sub-array. Recording resistivity-related readings corresponding to respective separation readings generated from analyzing respective received signals from opposite directions can be conducted, where the respective separation readings are less than or equal to a threshold level. The sub-arrays can be operated in an iterative process using a different selected sub-array or the sub-array at a different operating frequency in different iterations, where the iterative process begins with operating one of the sub-arrays having a largest separation distance of the plurality of sub-arrays. The sub-arrays can be operated in an iterative process using a different selected sub-array or the sub-array at a different operating frequency in different iterations, where the iterative process begins with operating at a frequency that is a lowest frequency among a set of operating frequencies. An iterative process can include operating each sub-array in the same manner, though selection of activation of transmitters and collection of signals from such activation can be conducted in any ordered fashion to provide the desired set of measurements.

When the separation reading is not zero but the separation reading is less than or equal to a threshold level, which can correspond to the separation reading not being significantly large, the resistivity-related readings can be taken as a valid measure to determine formation resistivity. One of the resistivity-related readings may be recorded as the reading to use in further processing, since the difference between the two resistivity-related readings is not significant. Selection of one of the two resistivity-related readings, corresponding to a separation reading being less than or equal to a threshold level, to be recorded can be conducted in any appropriate manner. In addition, geosignals can be generated and analyzed with respect to the phase of the geosignals compared relative to a geosignal-based threshold. The geosignal analysis can be included in the overall analysis of the formation resistivity.

In an embodiment, a sub-array of the plurality of sub-arrays can be analyzed as to whether the sub-array being analyzed is influenced by a formation boundary by examining a phase of a geosignal generated from operating the sub-array being analyzed. A geosignal is a signal or representation that can be used for geosteering. Geosignals are indicative of the direction of drilling tools downhole as well as capable of detecting boundaries. Capabilities of geosignals are useful in geosteering to optimize well placement for maximum oil recovery. Apparatus and processing schemes, as discussed herein, allow for the generation of a geosignal. Generation of geosignals can be conducted in various ways as is known by those skilled in the art. A non-limiting example of geosignals may be taken from, but not limited to, the form of signals as is taught in U.S. Pat. No. 6,476,609.

Various components of a system include a tool having a plurality of sub-arrays, where the tool is operable in a well with the sub-arrays of the tool arranged to make azimuthal related measurements with respect to a borehole. The sub-arrays can have transmitting sensors and receiving sensors spaced apart by a separation distance, where at least two sub-arrays have different separation distances. A system including such a tool along with a control unit and a processing unit, as described herein or in a similar manner, can be realized in combinations of hardware and software based implementations. These implementations may include a machine-readable storage device having machine-executable instructions, such as a computer-readable storage device having computer-executable instructions, to operate the tool in a well. The machine-readable instructions can include instructions to generate a probe signal from a sub-array of the plurality of sub-arrays of the tool and receive, in the sub-array, a signal from a first direction and a signal from a second direction in response to generating the probe signal; compare a first resistivity-related reading from the signal from the first direction to a second resistivity-related reading from the signal from the second direction to provide a separation reading; and to record a resistivity-related reading from the comparison if the separation reading is less than or equal to a threshold level. The instructions can include instructions to operate a tool, a control unit, and a data processing unit in accordance with the teachings herein. Further, a machine-readable storage device, herein, is a physical device that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices.

FIG. 3 shows an example of an embodiment of a tool 305 that can be used in the determination of formation resistivity. Tool 305 can be realized as an embodiment of tool 105 and can be can used in accordance with methods discussed herein with respect to FIG. 2. Tool 305 includes transmitters and tilted receivers to measure resistivity that can be structured to provide an azimuthal resistivity array by activating different transmitters in combination with selecting appropriate tilted receivers to collect responses from activating the different transmitters. The transmitters spaced apart at different distances with respect to the tilted receivers allow investigation of a formation at different distances from tool 305 including relatively deep probing. The arrangement of tilted sensors also provides for azimuthal measurements. The azimuthal measurements may be conducted for a number of bins. For example, the number of bins can be set at 32 bins. The number of bins can be set to another number.

An ADR tool arranged similar to or identical to tool 305 can be used in various measurements similar to or identical to those measurement procedures taught herein. The transmitters and receivers can be spaced to provide a set of separation distances. For example, the upper transmitters can be spaced apart from the central tilted receivers at the same separation distances of the lower transmitters spaced apart from the central tilted receivers. Such a configuration provides a symmetric arrangement of sensors that can be grouped to provide a plurality of sub-arrays. Example separation distances can include separation distances of 16 inches, 32 inches, and 48 inches. Other separation distances can be used. In addition, there are separation distances that can be used that are not in a symmetric arrangement such as using the upper and lower transmitters with the remote tilted receiver, which can provide longer separation distances. In addition, tool 305 can be operated at a set of different frequencies. For example, tool 305 can be operated at frequencies including, but not limited to, 2 MHz, 500 KHz, and 125 KHz.

In various embodiments, apparatus can be arranged to determine formation resistivity including using such apparatus to determine formation resistivity from within a horizontal well or a high angle well. A tilted coil array can be used to determine formation resistivity of geological beds, including hydrocarbon-bearing formations, drilled with high angle or horizontal wells. Measurements and analysis can be conducted to determine which measurements, if any, may be affected by nearby beds, and to determine how to use the information to select those measurements that can be directly applied to determining the resistivity of the reservoir. Such apparatus and methods provide enhanced capabilities as compared to classical non-azimuthal resistivity measurements, used in the instances of high angle wells being drilled though a reservoir, that may be affected by nearby beds generally overlaying or underlying the reservoir. This occurrence of environmental perturbations in the classical measurements can result in erroneous estimation of the reservoir resistivity, possibly by a factor of two or even more. In addition, in conventional techniques that use non-azimuthal measurements, use of wave resistivity measurements have been considered to be significantly affected by formation boundaries. In various embodiments, operation using tilted sensors provides a mechanism to determine whether or not any of the resistivity measurements of a wave propagation procedure be considered as immune to the effect of the boundary.

Figure 4A:
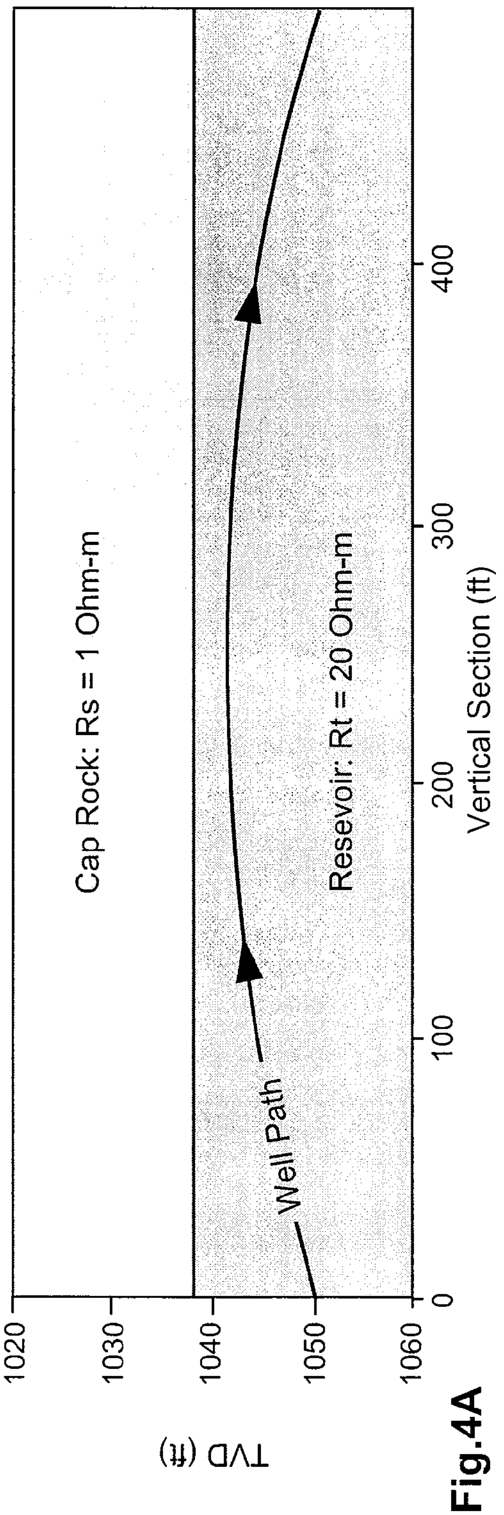
FIGS. 4A-B show an example of a cap rock over a reservoir and simulation of three wave resistivity measurements, in accordance with various embodiments.
Figure 4B:
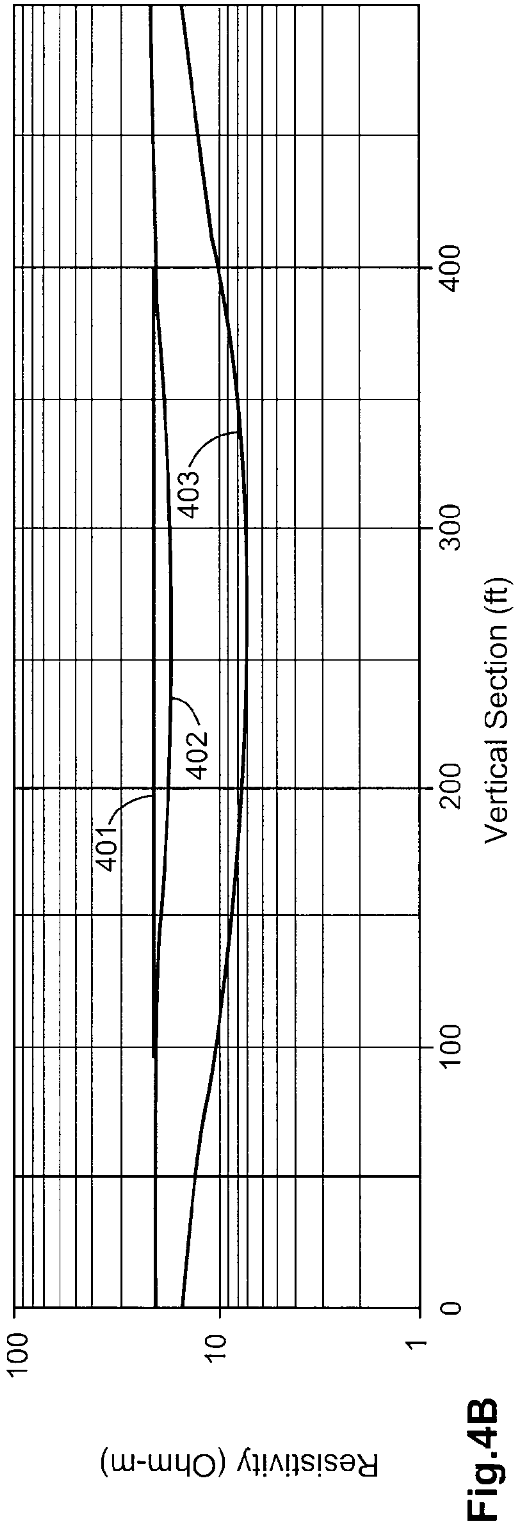

When logging-while-drilling horizontal or high angle wells with traditional non-azimuthal coil arrays, the proximity of a boundary induces a well-known phenomenon known as "polarization horn". An example of polarization horn is shown in FIGS. 4A-B, based on computer modeling. In FIG. 4A, a well path is shown in terms of the true vertical distance (TVD) versus vertical sections. In this example with a cap rock having a resistivity of 1 ohm-m and a reservoir having a true resistivity of 20 ohm-m, the coil array is simulated for wave resistivity measurements, where all three measurements shown by curves 401, 402, and 403 are non-azimuthal measurements. Curve 401 is a shallow measurement for a separation distance in transmitter-receiver pair of 16 inches operating at 2 MHz. Curve 402 is a medium measurement for a separation distance in transmitter-receiver pair of 32 inches operating at 500 KHz. Curve 403 is a deep measurement for a separation distance in transmitter-receiver pair of 48 inches operating at 125 KHz. As shown in FIG. 4A, the well path stays in the reservoir at all times, but the resistivity values measured by the different sub-arrays shown in FIG. 4B are significantly affected by the presence of the overlaying cap rock. For instance, the pattern of measurements shown in FIG. 4B is likely to be interpreted as a non-hydrocarbon bearing interval with a deep invasion. When the well path comes near the cap rock, but without leaving the reservoir, the deep resistivity measurement reads lower, in this particular case, than the reservoir, due to the influence of the nearby formation.

Figures 5A, 5B, 5C:
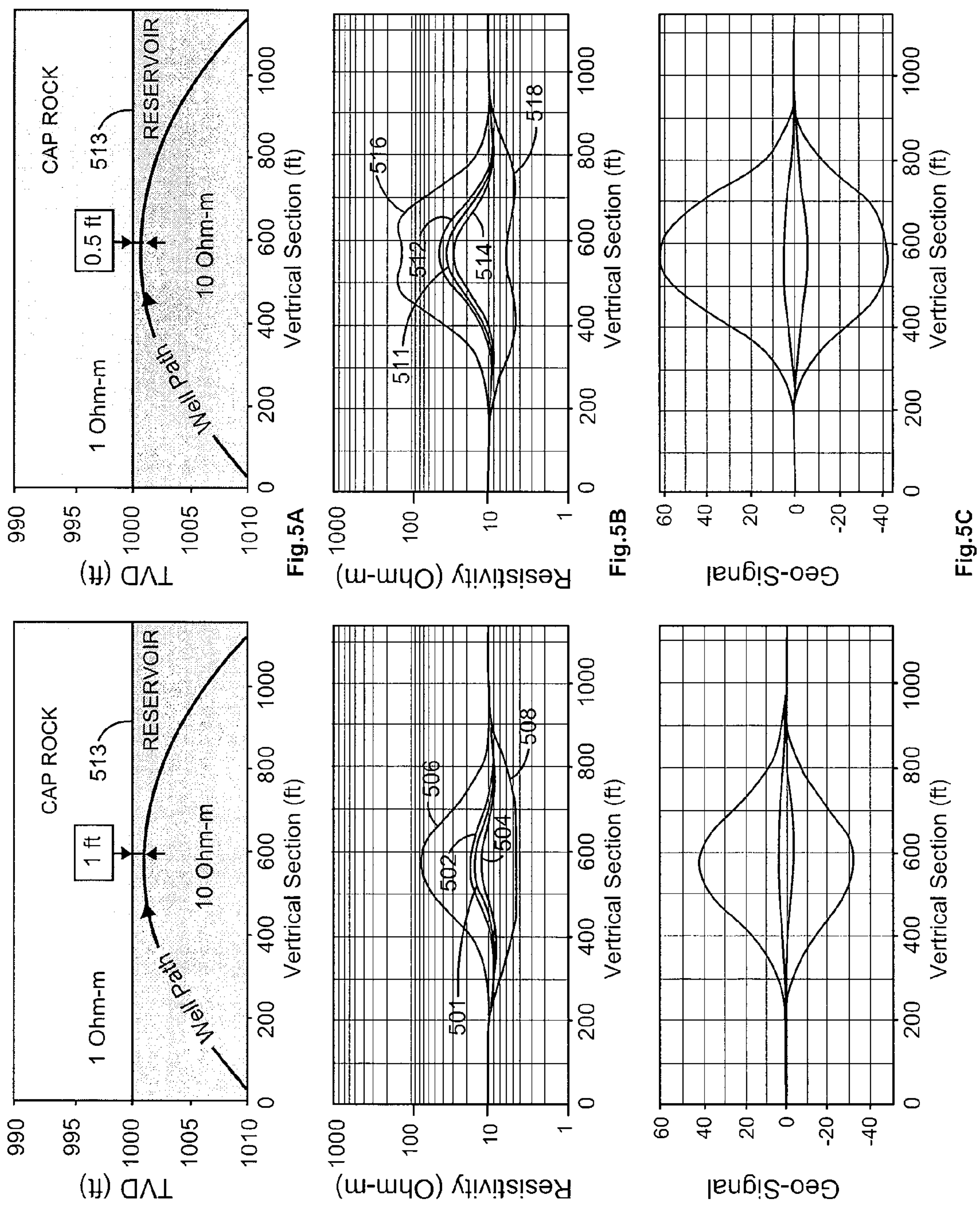
FIGS. 5A-C show an application of an azimuthal resistivity sensor to identify when a polarization horn is occurring, in accordance with various embodiments.

FIGS. 5A-C shows an application of an azimuthal resistivity sensor to identify when a polarization horn is occurring. FIG. 5A, in terms of the true vertical distance versus vertical sections, shows a well path that comes to within 1 foot of boundary 513 between cap rock and reservoir and a well path that comes to within 0.5 foot of boundary 513 between the cap rock and the reservoir. In FIG. 5B, resistivity is shown, where curves 502, 504, 506, 508, 512, 514, 516, 518 were generated from modeling a deep reading from a tool such as tool 305 of FIG. 3 with the separation distance at 48 inches operating at a frequency of 500 kHz. These curves were generated with respect to different azimuthal directions. Azimuthal measurements can be partitioned into sections of a rotation, where the sections are referred to as bins. Curves 506 and 516 are for azimuthal directions in which the investigation is directed below the measurement tool, where the corresponding bin is a down bin. Curves 508 and 518 are for azimuthal directions in which the investigation is directed above the measurement tool, where the corresponding bin is an up bin. Curves 502, 504, 512, and 514 are for azimuthal directions in which the investigation is directed to the sides of the measurement tool, which are in the direction to which the well is being formed and the direction from which it was formed, where the corresponding bins are side bins. Curves 502 and 512 are in opposite directions from 504 and 514.

In the configurations of FIG. 5A, as the well path comes near boundary 513, the polarization horn can induce the deep reading to overestimate, as shown in FIG. 5B, the resistivity of the reservoir giving too optimistic a view of the potential of the reservoir. The average response shown as curves 501 and 511 in FIG. 5B, reads higher than both the reservoir resistivity and the nearby bed resistivity. These "average" curves, 501 and 511, are identical to the log from a non-azimuthal wave resistivity with similar spacing and frequency.

FIG. 5C shows geosignals corresponding to the modeling of FIG. 5A and the modeled tool that generated the resistivity responses of FIG. 5B. The geosignals also provide an indication of the effect and presence of boundary 513 between the reservoir and the cap rock. Comparing FIGS. 5B and 5C with respect to FIG. 5A, it is seen that the measured resistivity of the reservoir is essentially the true reservoir resistivity when the well is in the reservoir, but not near the boundary of the reservoir. This correlation to the true resistivity is supported by the geosignals in FIG. 5C. At the distances where the measured resistivity is essentially the true resistivity of the reservoir, the phase of the geosignals is zero.

In reviewing the responses in FIG. 4B, it can be observed that the deep curve 403 is very affected by the overlaying formation, while the medium curve 402 is affected to a lesser degree and the shallow curve 401 is not affected at all. Though it may appear that the shallowest curve should be used to provide a formation resistivity, the shallowest curve 401 is likely to be affected by borehole effect and/or invasion. In contrast to non-azimuthal resistivity array sensors, azimuthal resistivity sensors, such as shown but not limited to an ADR tool shown in FIG. 3, can help to identify when a polarization horn is occurring and address the problem of borehole effect and/or invasion.

A distinct feature of an ADR tool is the ability to measure an apparent resistivity in all directions. Previous techniques of processing of data using an ADR examine the resistivity in all directions providing an average resistivity, which is the resistivity that would be measured by the traditional non-azimuthal wave resistivity methods. The traditional non-azimuthal wave resistivity methods include investigating formations, without considering direction, using sensors that co-linear along the length of the well. Using the sensors in an ADR tool can provide a different reading for different orientation of the tool.

In various embodiments associated with the apparatus and methods discussed herein, use is made of the observation that when resistivity is influenced by a boundary, resistivity measurements from opposite directions, such as up and down resistivity measurements, separate from each other. Initially, measurements can be taken up and down, and left and right relative to the ADR tool in which directions are partitioned into bins around a circle. The number of bins can be selected based on the application and processing parameters, where as the number of bins increases the amount of data and subsequent processing increases. The numbers of bins can be selected to be 32, though the total number of bins may be more or less than 32.

If the well and the tool disposed in the well are far from a boundary, then all of the readings should be essentially the same, since with the tool far from a boundary it is located in the same environmental formation, such as a reservoir, over which the probe signals investigate. When a well starts approaching a boundary, the boundary influences the reading of a traditional tool and provides differences between measurement signals taken from two different directions, such as but not limited to, up and down directions that are opposite each other. In various embodiments, a detected difference between up and down measurements, for example, provides an indicator that a boundary is nearby the well and that there is a validity issue with respect to a measured average resistivity as to whether or not this average resistivity can trusted as representing the true resistivity of the formation such as a reservoir.

Figure 6A:
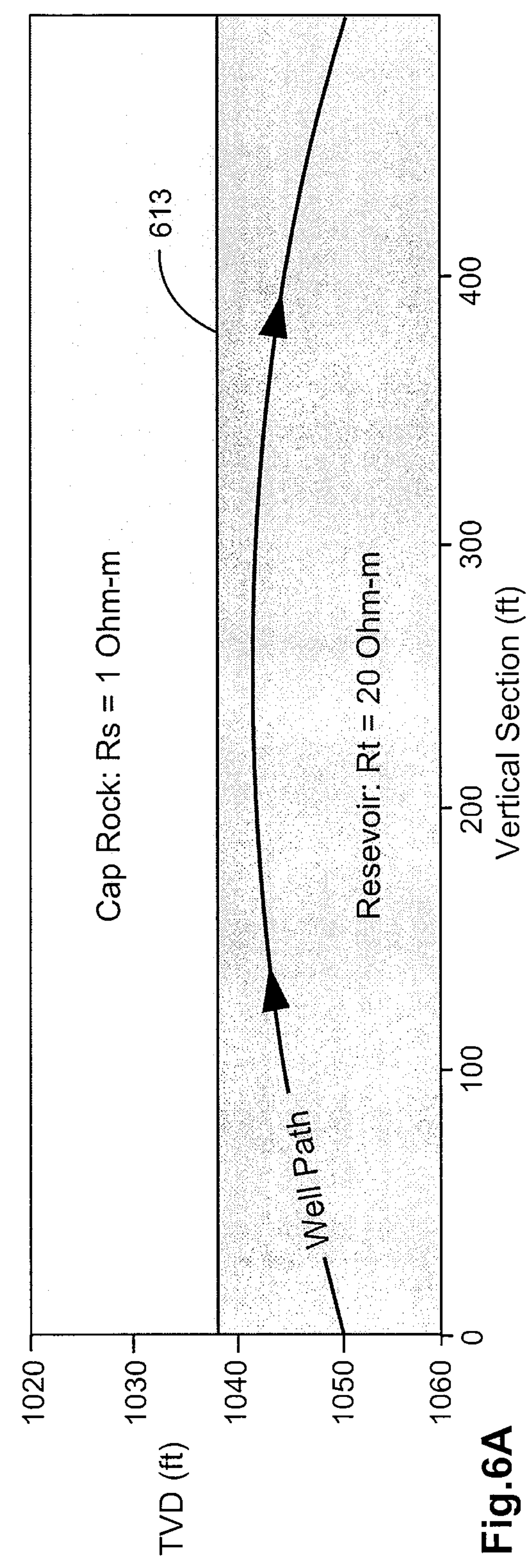
FIGS. 6A-B show modeling for the same environmental case as in FIG. 4, in which differences in resistivity from measurements in different directions are considered, in accordance with various embodiments.
Figure 6B:
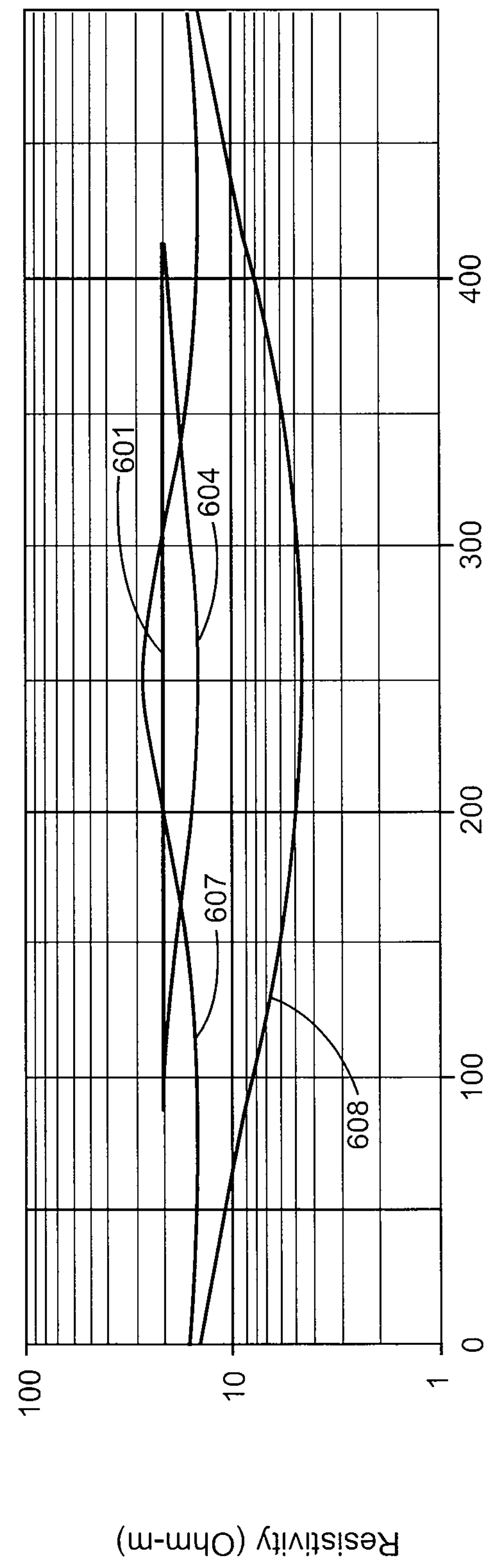
Figure 7:
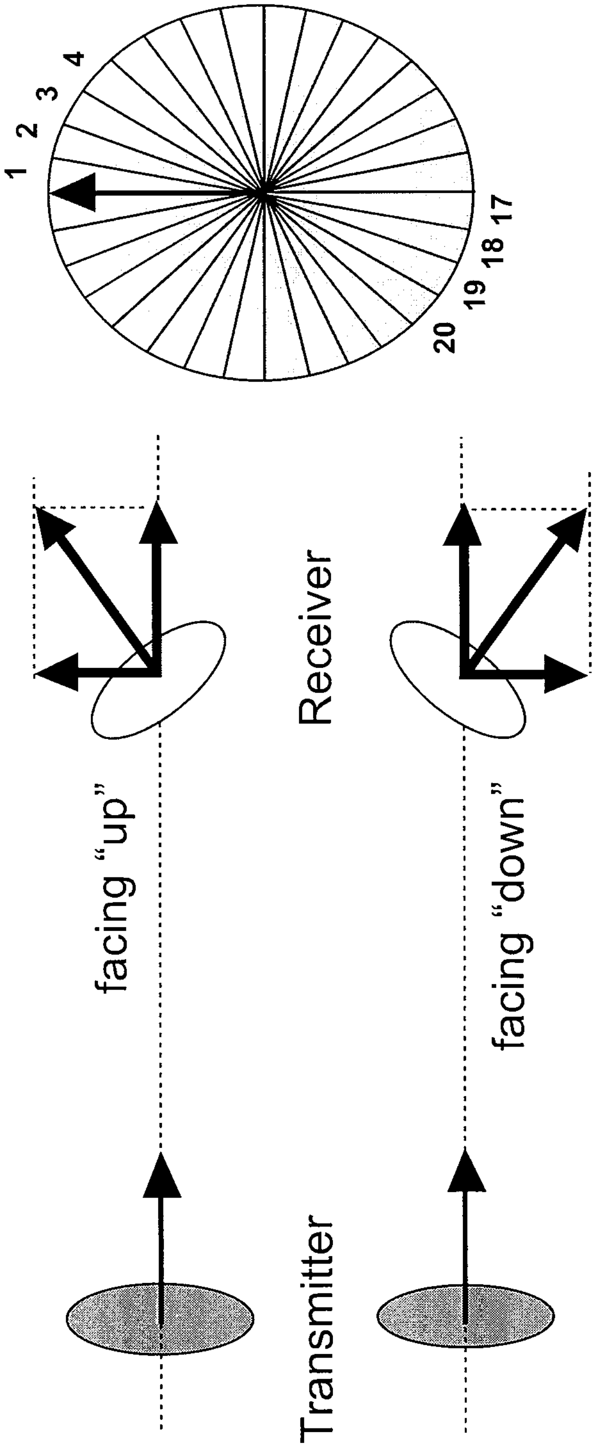
FIG. 7 shows an example of up orientations, down orientations, and bin orientation for a measurement tool including the tool of FIG. 3, in accordance with various embodiments.

In various embodiments, a tilted coil array having a number of sub-arrays to make resistivity related measurements, can used to determine if a given sub-array is under the influence of a boundary and by how much, i.e., the extent of the influence. FIGS. 6A-B show modeling for the same environmental case as in FIG. 4, in which differences in resistivity from measurements in different directions are considered. These differences can be provided by the tilted coil array to take into account azimuthal considerations, which provides a mechanism to analyze parameters, such as formation resistivity, from measurements in relation to the true value or status of the parameter for the formation. With a tool, such as discussed with respect to FIGS. 1-3, an effective resistivity can be determined in a direction that is above the tool providing an "up resistivity." An effective resistivity can be determined in a direction that is below the tool providing an "down resistivity." In FIG. 6B, curve 608 is an up resistivity for a sub-array having a separate distance of 48 inches operating at 125 kHz and curve 607 is a down resistivity for the sub-array having a separate distance of 48 inches operating at 125 kHz. Curve 601 is a resistivity for a sub-array having a separate distance of 16 inches operating at 2 MHz and curve 604 is a resistivity for a sub-array having a separate distance of 32 inches operating at 500 kHz. As shown in FIG. 6B, there is a separation in the measured resistivities between the up resistivity and the down resistivity, shown in the comparison of curves 607 and 608, which is correlated to the well path approaching and leaving the boundary between the cap rock and the reservoir. The separation between up resistivity and down resistivity for a given sub-array indicates unequivocally that the array is influenced by the nearby formation. The up resistivity and the down resistivity can be determined from signals that are received in opposite directions. Opposite directions that are 180° degrees apart can be measured with respect to opposite bins, for example bin 1 and bin 17 in a control/processing arrangement using 32 bins, as shown for example in FIG. 7 that can be used with respect to embodiments of tools and procedures as described herein.

From FIG. 6B, it can be seen that when a given sub-array is under the influence of a nearby boundary to the reservoir, the corresponding opposite azimuthal resistivity curves separate from each other. This is also shown in FIG. 5B when comparing the resistivities from the up bin and the down bin as well as analyzing the resistivities associated with the side bins and the average resistivity.

Figure 8:
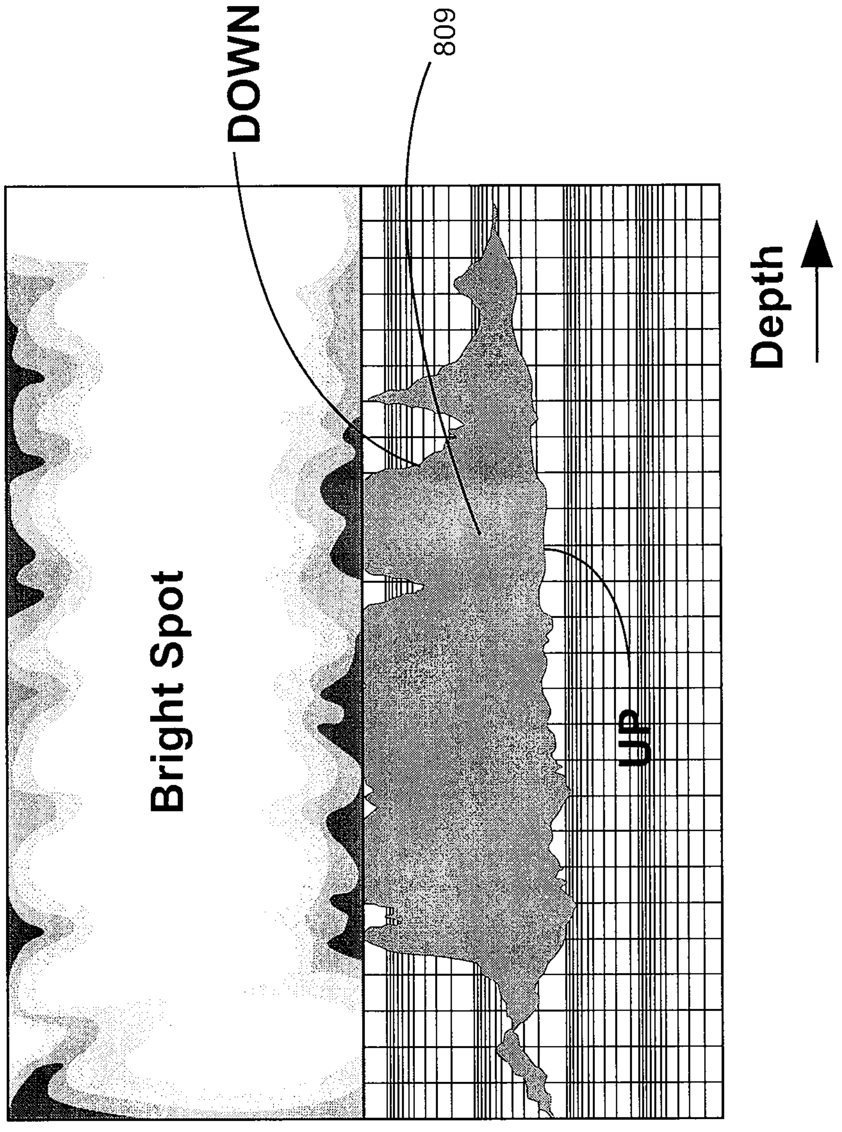
FIG. 8 shows a display of an image corresponding to separation in measurement corresponding to a measurement with the tool of FIG. 3, in accordance with various embodiments.

In the case of approaching a boundary from the side, a separation reading can be provided by two opposing azimuthal resistivity measurements, aligned with a normal from the well axis to the boundary. The situation of approaching a boundary from the side can be identified by displaying all the azimuthal resistivity readings or displaying an image of the resistivity. An example of displaying an image using tool 305 of FIG. 3 is shown in FIG. 8. Such an image can be referred to as a resistivity map. When running close to a boundary, the separation between opposing resistivities can be seen as an image artifact, such as a "bright spot." The bright spot corresponds to region 809 that separates the measured down resistivity from the measured up resistivity, which indicates that separation between curves from opposing bins can also be seen on an image of the resistivity, unfolded. In this case, the separation is a maximum in the up-down direction and the image shows a bright spot centered in the middle of the image. If the separation were between left-right curves, the bright spot would be shifted to the side. The image showing unsymmetrical azimuthal characteristics provides enhancements with respect to analyzing a curve from each bin, where using 32 bins for example would include 32 curves to analyze.

Another technique to determine whether a given sub-array is being influenced by a boundary that is being approached includes examining the phase of a geosignal corresponding to the given sub-array. With no influence provided by a boundary, such as a well located in a reservoir far from a boundary, the phase of the geosignal is essentially zero. An increase in the magnitude of geosignal phase indicates the influence of the boundary.

Use of an ADR tool allows for an independent way of identifying that a particular transmitter-receiver pair or combination is under the influence of a boundary to a significant amount such that the information from the processed data cannot be trusted. A sub-array of an ADR tool can also be characterized by its operating frequency, whether it is measuring phase or attenuation. To evaluate the influence of a boundary at different depths of investigation, multiple measurements can be taken based operation at multiple frequencies in addition to or with operation at multiple separation spacings of the transmitter-receiver pairs among the sub-arrays of the tool. With grouping of the transmitters and receivers on the tool, the longer the spacing between transmitter and corresponding receiver the deeper is the depth of investigation. In addition, the lower the operating frequency, the deeper is the depth of investigation.

Figure 9:
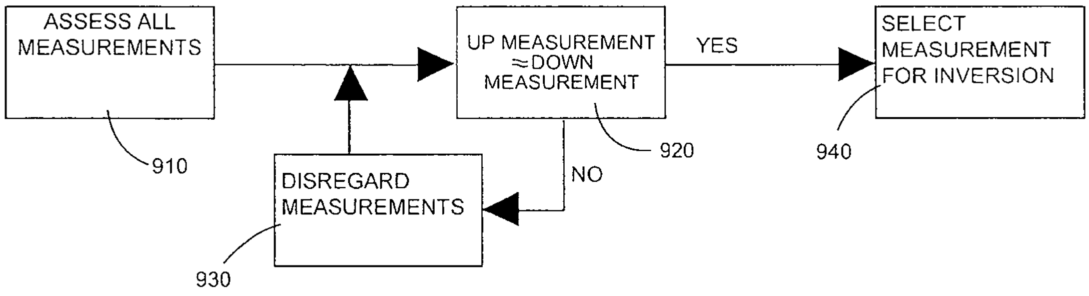
FIG. 9 shows features of an embodiment of a method to determine resistivity, in accordance with various embodiments.

FIG. 9 shows features of an embodiment of a method to determine resistivity. This method can be implemented to determine parameters in wells, including horizontal wells, such as a true resistivity of a formation. At 910, all measurements can be assessed. All measurements of a an azimuthal based tool, similar to or identical to tool 105 of FIG. 1 or tool 305 of FIG. 3, can be taken by all the sub-arrays to be used and at all frequencies to be used, followed by assessing each pair of resistivity-related measurements of each sub-array at an each operating frequency. Alternatively, pairs of resistivity-related readings can be evaluated individually for a selected sub-array at a selected operating frequency before taking the entire set of measurements is made. The deepest measurement is based on the largest separation distance of the grouping of transmitters and receivers in a sub-array of the tool used to make the measurements. For a given separation distance, the deepest measurement can be provided by operating the sub-array at the lowest frequency in the set of operating frequencies used in the measurement process. Each resistivity-related pair of signals can be measured as a compensated measurement, such as is capable with ADR measurements using the tool of FIG. 3.

At 920, the up measurement and the down measurement from conducting the measurement are compared. The comparison can be made to determine if the up measurement is approximately equal to the down measurement. Measurements from opposite sides can also be compared as to whether these opposite side measurements are approximately equal to each other. The comparison can be made by examining the difference between corresponding signals from the up and down direction relative to a threshold level. A threshold level can be set at a value that has an upper range between 1% to 5% of a total reading. At lower thresholds, there is less allowable deviation from a true value of the parameter in the measurement. At 930, if the up measurement is not approximately equal to the down measurement, these measurements are disregarded. A disregarded measurement can be discarded from the data storage region of the system or maintained, at least temporarily, and ignored.

At 940, a resistivity-related reading from the comparison of measurements from opposite directions using a given sub-array is selected as a measurement data point for inversion, if the up measurement is approximately equal to the down measurement. The inversion of the measurements can be conducted to provide the true resistivity ($R_T$) of the formation, resistivity ($R_{XO}$) associated with invasion, and the diameter of invasion ($D_I$).

The process of FIG. 9 can also be performed with respect to side measurements. In addition, the process can be conducted to examine the formation at all angles relative to the measurement tool. Measurement at these angles can be performed in accordance with the number bins generated for controlling and processing data collected by the sub-arrays of the tool used. Measurement at each angle is assigned to the measurement for its corresponding bin.

The process can be performed at different separation distances and operating frequencies to generate geosignals. The comparison can be set to a threshold level for a geosignal. The comparison can be set to a threshold level for a geosignal having a magnitude of phase equal to or less than a predetermined magnitude. A non-zero magnitude of phase can be set, as a threshold level, to a small percentage of a total magnitude, which may be determined using various simulations, testing, or other data to set the threshold. As noted, the magnitude of a geosignal provides an indication of the influences of boundaries on the measurements of the characteristic parameters of the formation under investigation. Equivalent to resistivity measurements, when the phase of the geosignal signal is zero or is less than or equal to a threshold level, this geosignal provides an indication that the reading of the resistivity may not affected by an influence from a boundary. A threshold can be set at a value that has an upper range between 1% to 5% of a total reading. At lower thresholds, there is less allowable deviation from a true value of the parameter in the measurement.

In various embodiments, all the data from all the spacings (separation distances) and from all the operating frequencies is examined such that when there is no separation in the corresponding measurements or the separation is less than or equal to a threshold level, the measured value is considered valid and can be used to provide the true resistivity of the reservoir. Though operating at the lowest spacings and/or at the highest frequencies may be absent a separation in measurements from the opposite directions, such measurements should be validated, since the shallowest measurements are sensitive to borehole effects, invasion, and other parasitic effects. In some instances, the data from the shallowest investigation can be ignored. The processes discussed herein can be viewed as operating between two extremes. At one extreme are the investigations from the longest distances that may be affected by boundaries and at the other extreme are the investigations from the shallowest ones that can be affected by a borehole effect and/or invasion. Since it is realized that the measurements at the longest distances may be affected by boundaries, an iterative process can provide for investigating at distances that are iteratively reduced to obtain measurements not affected by boundaries. Once the separation is elimination or reduced below a threshold level and the next reading at a lower investigation distance provides a substantially same reading, this reading can be taken to be an appropriate reading with other reading to generate the true resistivity. Appropriate readings can be subjected to an inversion process to generate a true resistivity $R_T$ to account for invasion issues.

Herein, inverting data includes converting measured data into information correlated to features related to formation layers. An inversion process can be realized using a forward model for the tool. A forward model provides a set of mathematical relationships for sensor response that can be applied to determining what a selected sensor would measure in a particular environment, which may include a particular formation. A library can include information regarding various formation properties that can be correlated to measured responses to selected probe signals. Performing an inversion operation or inversion operations can include performing an iterative process or performing a pattern matching process. The forward model and/or library can be stored in the same machine-readable medium device, different machine-readable media devices, or distributed over machine-readable media system at different locations. The instructions in the machine-readable media device or the machine-readable media system can include instructions to perform an inversion operation or inversion operations by performing an iterative process or performing a pattern matching process.

Figure 10:
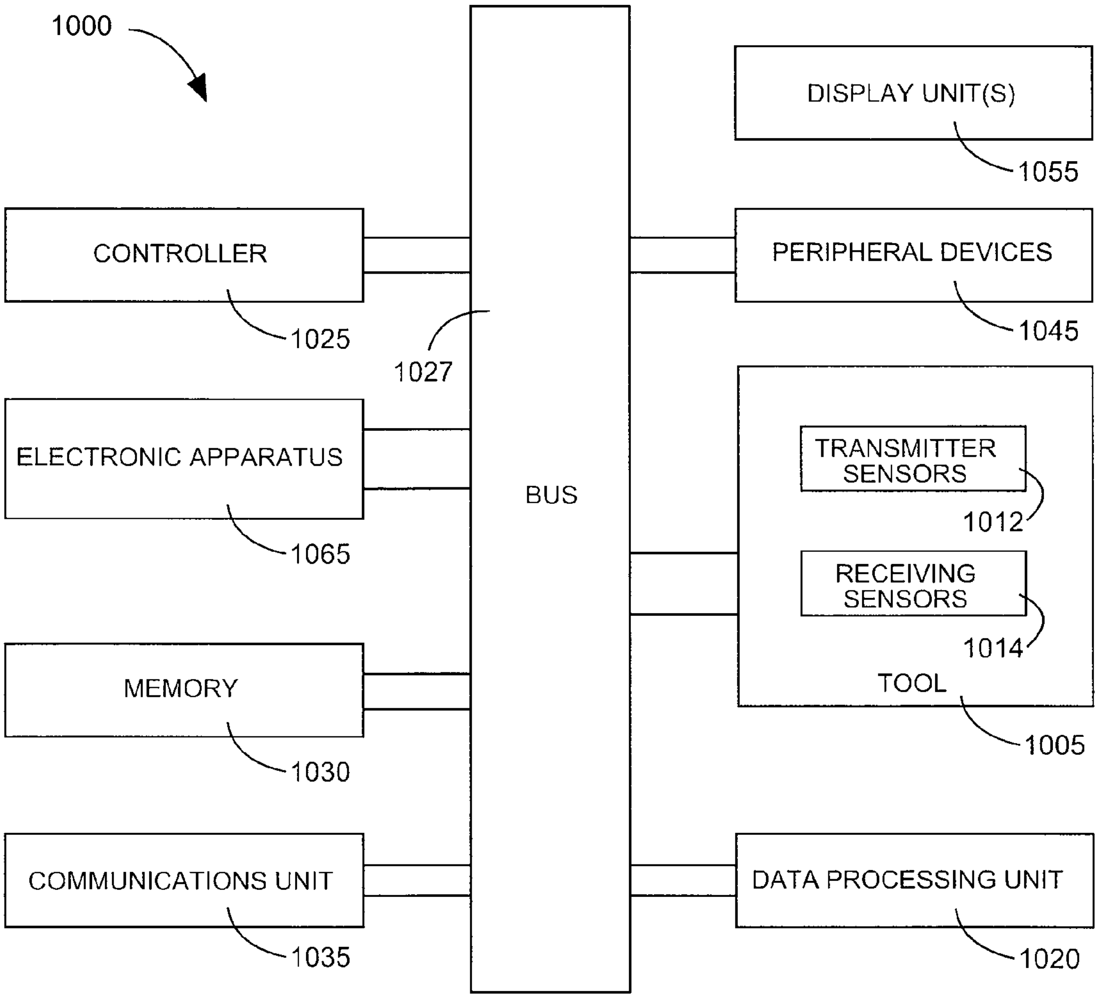
FIG. 10 depicts a block diagram of features of an example system to determine formation resistivity, in accordance with various embodiments.

FIG. 10 depicts a block diagram of features of an example embodiment of a system 1000 having a tool 1005 configured with sensors arranged in sub-arrays to make azimuthal related measurements with respect to a borehole, where each sub-array includes a transmitting sensor spaced apart from a receiving sensor by a separation distance. Tool 1005 having an arrangement of transmitter sensors 1012 and receiver sensors 1014 that can be realized in a similar or identical manner to arrangements of sensors discussed herein. System 1000 also includes a data processing unit 1020 to analyze received signals in a sub-array, in response to a probe signal from a transistor sensor in the sub-array, from a first direction and a second direction such that a separation reading is provided from a comparison, with respect to the respective probe signal generated, of a first resistivity-related reading from the signal from the first direction to a second resistivity-related reading from the signal from the second direction. Data processing unit 1020 can control recording a resistivity-related reading from the comparison if the separation reading is less than or equal to a threshold level. System 1000 can be configured to operate in accordance with the teachings herein.

System 1000 can include a controller 1025, a memory 1030, an electronic apparatus 1065, and a communications unit 1035. Controller 1025, memory 1030, and communications unit 1035 can be arranged to operate as a processing unit to control operation of tool 1005 having an arrangement of transmitter sensors 1012 and receiver sensors 1014 and to determine a valid formation resistivity in a manner similar or identical to the procedures discussed herein. Data processing unit 1020, to determine a valid formation resistivity in a manner similar or identical to the procedures discussed herein, can be implemented as a single unit or distributed among the components of system 1000 including electronic apparatus 1065. Controller 1025 and memory 1030 can operate to control activation of transmitter sensors 1012 and selection of receiver sensors 1014 in tool 1005 and to manage processing schemes in accordance with measurement procedures and signal processing as described herein. Data processing unit 1020 and/or other components of system 1000 can be configured, for example, to operate similar to or identical to the components of system as described herein and/or similar to or identical to any of methods described herein.

Communications unit 1035 can include downhole communications for appropriately located sensors. Such downhole communications can include a telemetry system. Communications unit 1035 may use combinations of wired communication technologies and wireless technologies at frequencies that do not interfere with on-going measurements.

System 1000 can also include a bus 1027, where bus 1027 provides electrical conductivity among the components of system 1000. Bus 1027 can include an address bus, a data bus, and a control bus, each independently configured or in an integrated format. Bus 1027 can be realized using a number of different communication mediums that allows for the distribution of components of system 1000. Use of bus 1027 can be regulated by controller 1025.

In various embodiments, peripheral devices 1045 can include displays, additional storage memory, and/or other control devices that may operate in conjunction with controller 1025 and/or memory 1030. In an embodiment, controller 1025 is realized as a processor or a group of processors that may operate independently depending on an assigned function. Peripheral devices 1045 can be arranged with a display, as a distributed component on the surface, that can be used with instructions stored in memory 1030 to implement a user interface to monitor the operation of tool 1005 and/or components distributed within system 1000. The user interface can be used to input parameter values for thresholds such that system 1000 can operate autonomously substantially without user intervention. The user interface can also provide for manual override and change of control of system 1000 to a user. Such a user interface can be operated in conjunction with communications unit 1035 and bus 1027.

Figure 11:
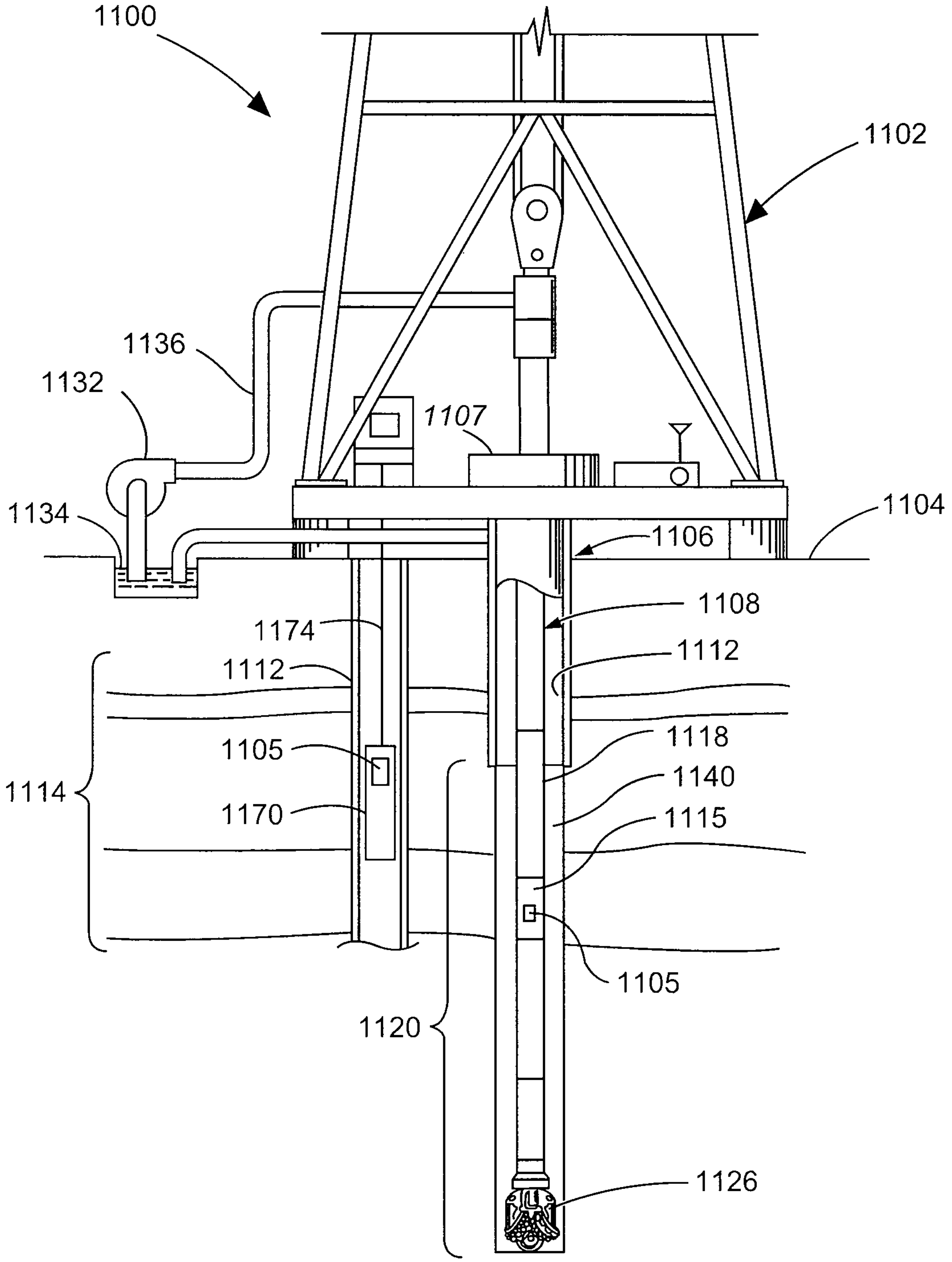
FIG. 11 depicts an example system at a drilling site, where the system includes a tool configured to determine formation resistivity, in accordance with various embodiments.

FIG. 11 depicts an embodiment of a system 1100 at a drilling site, where system 1100 includes a tool 1105 having sensors configured with sensors arranged in sub-arrays to make azimuthal related measurements with respect to a borehole, where each sub-array includes a transmitting sensor spaced apart from a receiving sensor by a separation distance. Tool 1105 having an arrangement of transmitter sensors and receiver sensors can be realized in a similar or identical manner to arrangements of sensors discussed herein. System 1100 also includes a data processing unit, which can be integrated with tool 1105, to analyze received signals in a sub-array, in response to a probe signal from a transmitter sensor in the sub-array, from a first direction and a second direction such that a separation reading is provided from a comparison, with respect to the respective probe signal generated, of a first resistivity-related reading from the signal from the first direction to a second resistivity-related reading from the signal from the second direction. Data processing unit can be arranged to control recording a resistivity-related reading from the comparison if the separation is less than or equal to a threshold level. Tool 1105 can be structured and fabricated in accordance with various embodiments as taught herein with respect to a sensor tool having an arrangement of transmitters and receivers to make azimuthal related measurements with respect to a borehole.

System 1100 can include a drilling rig 1102 located at a surface 1104 of a well 1106 and a string of drill pipes, that is, drill string 1108, connected together so as to form a drilling string that is lowered through a rotary table 1107 into a wellbore or borehole 1112. The drilling rig 1102 can provide support for drill string 1108. The drill string 1108 can operate to penetrate rotary table 1107 for drilling a borehole 1112 through subsurface formations 1114. The drill string 1108 can include drill pipe 1118 and a bottom hole assembly 1120 located at the lower portion of the drill pipe 1118.

The bottom hole assembly 1120 can include drill collar 1115, tool 1105 attached to drill collar 1115, and a drill bit 1126. The drill bit 1126 can operate to create a borehole 1112 by penetrating the surface 1104 and subsurface formations 1114. Tool 1105 can be structured for an implementation in the borehole of a well as a MWD system such as a LWD system. The housing containing tool 1105 can include electronics to activate transmitters of tool 1105 and collect responses from receivers of tool 1105. Such electronics can include a data processing unit to analyze signals sensed by tool 1105 and provide measurement and analyzed results to the surface over a standard communication mechanism for operating a well. Alternatively, electronics can include a communications interface to provide signals sensed by tool 1105 to the surface over a standard communication mechanism for operating a well, where these sensed signals can be analyzed at a processing unit at the surface.

During drilling operations, the drill string 1108 can be rotated by the rotary table 1107. In addition to, or alternatively, the bottom hole assembly 1120 can also be rotated by a motor (e.g., a mud motor) that is located downhole. The drill collars 1115 can be used to add weight to the drill bit 1126. The drill collars 1115 also can stiffen the bottom hole assembly 1120 to allow the bottom hole assembly 1120 to transfer the added weight to the drill bit 1126, and in turn, assist the drill bit 1126 in penetrating the surface 1104 and subsurface formations 1114.

During drilling operations, a mud pump 1132 can pump drilling fluid (sometimes known by those of skill in the art as "drilling mud") from a mud pit 1134 through a hose 1136 into the drill pipe 1118 and down to the drill bit 1126. The drilling fluid can flow out from the drill bit 1126 and be returned to the surface 1104 through an annular area 1140 between the drill pipe 1118 and the sides of the borehole 1112. The drilling fluid may then be returned to the mud pit 1134, where such fluid is filtered. In some embodiments, the drilling fluid can be used to cool the drill bit 1126, as well as to provide lubrication for the drill bit 1126 during drilling operations. Additionally, the drilling fluid may be used to remove subsurface formation 1114 cuttings created by operating the drill bit 1126.

Using tilted sensors provides a process to verify whether a conducted resistivity measurement is immune to, or not under the influence of a nearby boundary, such that a reading for a reservoir can be relied upon. Procedures identical to or similar to the processes as taught herein provide a technique, which can be independent from other processes, that generates a measurement indicating a nearby boundary and that provides a validation as to whether a determined average resistivity can be trusted. If the validation procedure indicates that the measurement cannot be trusted, other more sophisticated models may be implemented to compute resistivity information of a formation under investigation. The determination of the influence of a boundary can be performed in real time as a drilling operation is being conducted and the collected and processed data can be recorded. The processed data can also be used real time in the drilling operation to provide information used to direct the drilling operation.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:

generating a probe signal from a sub-array of a plurality of sub-arrays of a tool and receiving, in the sub-array, a signal from a first direction and a signal from a second direction in response to generating the probe signal, the sub-arrays of the tool arranged to make azimuthal related measurements with respect to a borehole;

comparing a first resistivity-related reading from the signal from the first direction to a second resistivity-related reading from the signal from the second direction to provide a separation reading;

comparing the separation reading to a threshold level; and recording a resistivity-related reading as a valid measure to determine formation resistivity from the comparison of the separation reading to the threshold level when the separation reading is less than or equal to the threshold level.

2. The method of claim 1, wherein the method includes operating the tool structured with each sub-array of the tool having a transmitter and a receiver spaced apart by a separation distance such that at least two sub-arrays of the tool have different separation distances.

3. The method of claim 2, wherein the method includes operating the sub-arrays in an iterative process using a different selected sub-array or the sub-array at a different operating frequency in different iterations, the iterative process beginning with operating one of the sub-arrays having a largest separation distance of the plurality of sub-arrays.

4. The method of claim 1, wherein the method includes operating the sub-arrays in an iterative process using a different selected sub-array or the sub-array at a different operating frequency in different iterations, the iterative process beginning with operating at a frequency that is a lowest frequency among a set of operating frequencies.

5. The method of claim 1, wherein the method includes:

inverting a set of resistivity-related readings, each one of the set corresponds to a separation reading being less than or equal to the threshold level, the set of resistivity-related readings acquired from using the plurality of sub-arrays; and determining a formation parameter from inverting the set.

6. The method of claim 5, wherein determining the formation parameter includes determining one or more of a true resistivity, a resistivity of an invaded zone of a borehole, or a diameter of the invaded zone.

7. The method of claim 1, wherein the method includes using all of the sub-arrays to generate probe signals and to receive signals from two opposite directions in response to each respective probe signal generated from each respective sub-array and recording resistivity-related readings corresponding to respective separation readings, generated from analyzing respective received signals from opposite directions, being less than or equal to the threshold level.

8. The method of claim 1, wherein comparing the first resistivity-related reading with the second resistivity-related reading includes comparing a first resistivity based on the signal from the first direction to a second resistivity based on the signal from the second direction.

9. The method of claim 1, wherein the method includes analyzing a sub-array of the plurality of sub-arrays as to whether the sub-array being analyzed is influenced by a formation boundary by examining a phase of a geosignal generated from operating the sub-array being analyzed.

10. The method of claim 1, wherein the method includes operating the tool structured with the sub-arrays including a tilted coil.

11. The method of claim 1, wherein the method includes operating the tool structured as an azimuthal deep resistivity sensor.

12. The method of claim 1, wherein the method includes marking, in an analysis unit or a database, the sub-array as not being a good sub-array for a measurement in which the probe signal is generated from the sub-array, when the separation reading is greater than the threshold.

13. The method of claim 1, wherein the method includes evaluating the separation reading with respect to the threshold level to characterize validity of a measurement in which the probe signal is generated from the sub-array.

14. A non-transitory machine-readable storage device having instructions stored thereon, which, when performed by a machine, cause the machine to perform operations, the operations comprising:

generating a probe signal from a sub-array of a plurality of sub-arrays of a tool and receiving, in the sub-array, a signal from a first direction and a signal from a second direction in response to generating the probe signal, the sub-arrays of the tool arranged to make azimuthal related measurements with respect to a borehole;

comparing a first resistivity-related reading from the signal from the first direction to a second resistivity-related reading from the signal from the second direction to provide a separation reading;

comparing the separation reading to a threshold level; and recording a resistivity-related reading as a valid measure to determine formation resistivity from the comparison of the separation reading to the threshold level when the separation reading is less than or equal to the threshold level.

15. The non-transitory machine-readable storage device of claim 14, wherein the instructions include an instruction to operate the tool structured with each sub-array of the tool having a transmitter and a receiver spaced apart by a separation distance such that at least two sub-arrays of the tool have different separation distances; and to operate the sub-arrays in an iterative process using a different selected sub-array or the sub-array at a different operating frequency in different iterations, the iterative process to begin with operating one of the sub-arrays having a largest separation distance of the plurality of sub-arrays.

16. The non-transitory machine-readable storage device of claim 14, wherein the instructions include an instruction to operate the sub-arrays in an iterative process using the sub-array or a different selected sub-array at a different operating frequency in different iterations, the iterative process to begin with operating at a frequency that is a lowest frequency among a set of operating frequencies.

17. The non-transitory machine-readable storage device of claim 14, wherein the instructions include an instruction to invert a set of resistivity-related readings, each one of the set corresponding to a separation reading being less than or equal to the threshold level, the set of resistivity-related readings acquired from using the plurality of sub-arrays; and determine a formation parameter from inverting the set.

18. The non-transitory machine-readable storage device of claim 14, wherein the instructions include an instruction to use all of the sub-arrays to generate probe signals and to receive signals from two opposite directions in response to each respective probe signal generated from each respective sub-array and to record resistivity-related readings corresponding to respective separation readings, generated from analyzing respective received signals from opposite directions, being less than or equal to the threshold level.

19. The non-transitory machine-readable storage device of claim 14, wherein the instructions include an instruction to analyze a sub-array of the plurality of sub-arrays as to whether the sub-array being analyzed is influenced by a formation boundary by examining a phase of a geosignal generated from operating the sub-array being analyzed.

20. A system comprising:

a tool having plurality of sub-arrays, the tool being operable in a well, the sub-arrays of the tool arranged to make azimuthal related measurements with respect to a borehole;

a control unit operable to manage generation of a probe signal from a transmitter sensor from a sub-array of the plurality of sub-arrays and to manage collection of received signals at receivers in the respective sub-array, the received signals including a signal from a first direction and a signal from a second direction with respect to the respective probe signal generated; and a data processing unit arranged to analyze the signals from the first direction and the second direction such that a separation reading is provided from a comparison, with respect to the respective probe signal generated, of a first resistivity-related reading from the signal from the first direction to a second resistivity-related reading from the signal from the second direction, arranged to compare the separation reading to a threshold level, and arranged to control recording a resistivity-related reading as a valid measure to determine formation resistivity from the comparison of the separation reading to the threshold level when the separation reading is less than or equal to the threshold level.

21. The system of claim 20, wherein each sub-array of the tool includes a transmitter and a receiver spaced apart by a separation distance such that at least two sub-arrays of the tool have different separation distances.

22. The system of claim 21, wherein the control unit and the data processing unit are arranged to operate the sub-arrays in an iterative process to use a different selected sub-array or the sub-array at a different operating frequency in different iterations, the iterative process arranged to begin with operation of one of the sub-arrays that has a largest separation distance of the plurality of sub-arrays.

23. The system of claim 20, wherein the control unit and the data processing unit are arranged to operate the sub-arrays in an iterative process to use a different selected sub-array or the sub-array at a different operating frequency in different iterations, the iterative process arranged to begin with operation at a frequency that is a lowest frequency among a set of operating frequencies.

24. The system of claim 20, wherein the data processing unit is arranged to invert a set of resistivity-related readings, each one of the set corresponding to its respective separation reading being less than or equal to the threshold level, the set of resistivity-related readings acquired from operation of the plurality of sub-arrays; and to determine a formation parameter from the inversion of the set.

25. The system of claim 24, wherein the formation parameter includes one or more of a true resistivity, a resistivity of invaded zone of a borehole, or a diameter of the invaded zone.

26. The system of claim 20, wherein the control unit and the data processing unit are arranged to operate all of the sub-arrays to generate probe signals and to receive signals from two opposite directions in response to each respective probe signal generated from each respective sub-array and to record resistivity-related readings corresponding to respective separation readings, generated from analysis of respective received signals from opposite directions, being less than or equal to the threshold level.

27. The system of claim 20, wherein the control unit and the data processing unit are arranged to operate a selected sub-array of the plurality of sub-arrays and to analyze whether the selected sub-array being is influenced by a formation boundary by examination of a phase of a geosignal generated from operation of the selected sub-array.

28. The system of claim 20, wherein each sub-array includes a tilted coil.

29. The system of claim 28, wherein each sub-array includes a grouping having two transmitters and two receivers structured with a symmetrical orientation.

30. The system of claim 20, wherein the tool is structured as an azimuthal deep resistivity sensor.

31. The system of claim 20, wherein the tool is arranged as a logging-while-drilling tool.

32. The system of claim 20, wherein the control unit and the data processing unit are integrated in one or more housings operable in a well with the plurality of sub-arrays.

* * * * *

UNITED STATES PATENT AND TRADEMARK OFFICE

CERTIFICATE OF CORRECTION

PATENT NO. : 9,239,403 B2
APPLICATION NO. : 13/220112
DATED : January 19, 2016
INVENTOR(S) : Bittar et al.

It is certified that error appears in the above-identified patent and that said Letters Patent is hereby corrected as shown below:

On the Title page, in item (73), in "Assignee", in column 1, line 1, delete "Hallibburton" and insert --Halliburton--, therefor On page 2, in column 2, item (56), under "Other Publications", line 7, delete "B,," and insert --B.,--, therefor Signed and Sealed this
Twelfth Day of July, 2016

Michelle K. Lee
*Director of the United States Patent and Trademark Office*